(12) United States Patent
Graveline et al.

(10) Patent No.: US 7,805,513 B2
(45) Date of Patent: *Sep. 28, 2010

(54) ACCESS CONTROL LIST CHECKING

(75) Inventors: Marc Graveline, Ottawa (CA); Ulf Viney, Ottawa (CA); Matt Masson, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 26 days.

This patent is subject to a terminal disclaimer.

(21) Appl. No.: 12/262,661

(22) Filed: Oct. 31, 2008

(65) Prior Publication Data

US 2009/0055905 A1 Feb. 26, 2009

Related U.S. Application Data

(63) Continuation of application No. 11/159,928, filed on Jun. 23, 2005, now Pat. No. 7,475,138.

(51) Int. Cl.
*G06F 15/16* (2006.01)
*G06F 12/00* (2006.01)

(52) U.S. Cl. ...................................... 709/225; 709/229

(58) Field of Classification Search ......... 709/217–219, 709/225–229, 250
See application file for complete search history.

(56) References Cited

U.S. PATENT DOCUMENTS

| | | | |
|---|---|---|---|
| 7,076,558 B1 | 7/2006 | Dunn | |
| 7,100,195 B1 | 8/2006 | Underwood | |
| 7,475,138 B2 * | 1/2009 | Graveline et al. | ........... 709/225 |
| 2003/0114144 A1 | 6/2003 | Minemura | |
| 2004/0064721 A1 | 4/2004 | Murching et al. | |
| 2004/0193906 A1 | 9/2004 | Dar et al. | |
| 2005/0015674 A1 | 1/2005 | Haugh | |
| 2005/0022010 A1 | 1/2005 | Swander et al. | |
| 2005/0091068 A1 | 4/2005 | Ramamoorthy et al. | |
| 2006/0041936 A1 * | 2/2006 | Anderson et al. | ............. 726/11 |
| 2006/0075478 A1 | 4/2006 | Hyndman et al. | |

* cited by examiner

*Primary Examiner*—Zarni Maung
(74) *Attorney, Agent, or Firm*—Stephen J. Walder, Jr.; Erin C. Ming

(57) ABSTRACT

Method and system for dynamically checking an access control list during the data transfers between a client web browser and a web server. The method and system allow checking of access control list by an application firewall, independent from the web application. The rules, upon which the checking is based, can be easily updated without affecting the web application.

16 Claims, 9 Drawing Sheets

```
<FORM METHOD="GET" ACTION=

"http://www.example.com/cgi-bin/file-query">

Number <INPUT NAME="a"> <P>

Street <INPUT NAME="b"> <P>

User <INPUT NAME="c"> <P>

Press button to submit: <INPUT TYPE="submit" VALUE="SUBMIT">
<P>

</FORM>
```

"file-query?a=888&b=Main&c=admin"

828
Query: File=a, Action = execute,
Does the User have the privilege to execute on "a"?

ACCESS CONTROL LIST CHECKING

This application is a continuation of U.S. patent application Ser. No. 11/159,928, filed on Jun. 23, 2005.

FIELD OF INVENTION

The present invention relates to web application. More specifically, the present invention relates to web application security.

BACKGROUND OF THE INVENTION

The Internet is by far the largest, most extensive publicly available network of interconnected computer networks that transmit data by packet switching using a standardized Internet Protocol (IP) and many other protocols. The Internet has become an extremely popular source of virtually all kinds of information. Increasingly sophisticated computers, software, and networking technology have made Internet access relatively straightforward for end users. Applications such as electronic mail, online chat and web browser allow the users to access and exchange information almost instantaneously.

The World Wide Web (WWW) is one of the most popular means used for retrieving information over the Internet. WWW can cope with many types of data which may be stored on computers, and is used with an Internet connection and a web browser. The WWW is made up of millions of interconnected pages or documents which can be displayed on a computer or other interface. Each page may have connections to other pages which may be stored on any computer connected to the Internet. Uniform Resource Identifiers (URI) is an identifying system in WWW, and typically consists of three parts: the transfer format (also known as the protocol type), the host name of the machine which holds the file (may also be referred to as the web server name) and the path name to the file. The transfer format for standard web pages is Hypertext Transfer Protocol (HTTP). Hyper Text Markup Language (HTML) is a method of encoding the information so it can be displayed on a variety of devices.

HTTP is the underlying transactional protocol for transferring files (text, graphic images, sound, video, and other multimedia files) between clients and servers. HTTP defines how messages are formatted and transmitted, and what actions web servers and browsers should take in response to various commands. A web browser as an HTTP client, typically initiates a request by establishing a TCP/IP connection to a particular port on a remote host. An HTTP server monitoring that port waits for the client to send a request string. Upon receiving the request string (and message, if any), the server may complete the protocol by sending back a response string, and a message of its own, in the form of the requested file, an error message, or any other information. Web pages regularly reference to pages on other servers, whose selection will elicit additional transfer requests. When the browser user enters file requests by either "opening" a web file by typing in a Uniform Resource Locator (URL), or clicking on a hypertext link, the browser builds an HTTP request. In actual applications, web clients may need to be distinguished and authenticated, or a session which holds a state across a plurality of HTTP protocols may need to be maintained by using "state" called cookie.

An HTTP request may have following syntax: http://hostname/path?query

The hostname may be the name or IP address of a server, optionally followed by a colon and a port number. It may further include information on username and password for authenticating to the server. The path is a specification of a location in some hierarchical structure, using a slash ("/") as delimiter between components, for example, "/directory/subdirectory/file". The query part is typically intended to express parameters of a dynamic query to some database residing on the server, for example "?search=business".

To respond to the request from a web browser, Common Gateway Interface (CGI) programs may be run on the web server. CGI is a specification for transferring information between a web server and a web browser. Other interface may include ISAPI (Internet Service Application Programming Interface), an application programming interface (API) for Microsoft's Internet Information Server (IIS), The request from the web server may also pass-through a web server and reach the web application directly Dynamic feedback for web browser clients can also be provided to include scripts or programs that execute on the user's machine rather than on the web server, for example by way of Java applets, Javascript™, or ActiveX™ controls.

To determine the appropriate capability or permissions a web user can read from, write to or execute a given object in a web application, an Access Control List (ACL) can be implemented. An access control list may be in the form of a table, containing entries that specify individual user or group rights to specific objects, such as a program, a file directory, or a file.

An elevation of privilege is a term for a type of security vulnerability that allows a user to get more permissions than normally assigned, sometimes by using malicious means. For example, in a successful elevation of privilege attack, a malicious user manages to get administrative privileges to the web application, enabling the attacker to take control over web application. Elevation of privilege vulnerabilities may also include inadvertent security violations, e.g. the client application is able to access a service for which they are not authorized because the web application fails to implement the properly security checks.

Implementations of access control list may be complex as access control list applies to objects, directories, and for the objects and the sub directories within the directories. When an elevation of privilege is found, web application security may be compromised. To ensure the security of the web application, either the entire request may need to be blocked, or fixed through the change of the web application's architecture, which tend to be time consuming and complex.

US Application 20050015674 describes a portable access control list (PACL) model. The PACL is a global representation of the access control list including a tuple of identifiers, permissions and/or actions, and application rules. The portable ACL model is a superset of all existing identifiers, permissions, and actions. However, the PCAL does not provide a solution to provide security for release of web applications on a web server, nor does it check with a remote system.

US Application 20040193906 describes a system for use in a network implementing service applications. The system has an access control list with sets of associated client identification and destination service identification. The system analyzes an incoming service-access request, for source identification associated with a source of the service-access request; and destination service identification associated with an intended destination of the server-access request; the identification is based on service address and port number. The system then determines whether indicia of the source identification and of the destination service identification from the service-access request is included in the access control list in a manner that indicates that the source of the service-access request is authorized for access to a service associated with the destination service identification. While elevation of privilege violations, either inadvertent or malicious, may be avoided. This system is based on pairings of client-application combinations and services.

Similarly, US Application 20040064721 describes a namespace management module utilizing a persistent reservation store that associates URI namespaces with one or more permissions. The reservation store can contain a number of reservation entries that each include a URI identifying a URI namespace and a corresponding access control list that includes permissions for the identified URI namespace. When a request to register a URI namespace is received, the permissions of an appropriate access control list can be checked to determine if the registration is approved. When a resource request is received, permissions of the access control lists can also be checked to determine if the resource request should be routed to a registered process. The disclosed method only look at different web applications in different locations, it does not check the permission inside an application. This method also does not utilize rule based syntax, relying on an external system to register URI namespaces with the application.

Therefore, there is a need for an improved method and system to provide security to web applications. More specifically, there is a need to provide a method and system to dynamically check the permission and capability in an access control list (ACL) independently of the web application.

SUMMARY OF THE INVENTION

According to one aspect of the present invention there is provided a method of checking an access control list for a web application comprising the steps of: receiving a request from a web client; parsing the request to an application firewall; said application firewall having a rule and residing independently of the web application, said rule having syntax to identify a parameter in the request; checking the received request based on said rule; allowing the received request passing through the application firewall upon matching the rules; and checking the access control list with an authentication provider.

According to another aspect of the present invention there is provided a computer software product for checking an access control list for a web application comprising: a memory having microcontroller-readable code embedded therein for checking an access control list for a web application, said code comprising: code means for receiving a request from a web client; code means for parsing the request to an application firewall, said application firewall having a rule and residing independently of the web application, said rule having syntax to identify a parameter in the request; code means for checking the received request based on said rule; code means for allowing the received request passing through the application firewall upon matching the rules; and code means for checking the access control list with an authentication provider.

According to another aspect of the present invention there is provided a system for checking an access control list for a web application, comprising: means for receiving a request from a web client; means for parsing the request to an application firewall, said application firewall having a rule and residing independently of the web application, said rule having syntax to identify a parameter in the request; means for checking the received request based on said rule; means for allowing the received request passing through the application firewall upon matching the rules; and means for checking the access control list with an authentication provider.

BRIEF DESCRIPTION OF THE DRAWINGS

These and other features of the invention will become more apparent from the following description in which reference is made to the appended drawings wherein:

FIG. 8a illustrates the steps of checking access control list;

FIG. 8b shows an example of a check performed at step 828 in FIG. 8a;

DETAILED DESCRIPTION OF A PREFERRED EMBODIMENT

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Figure 1:
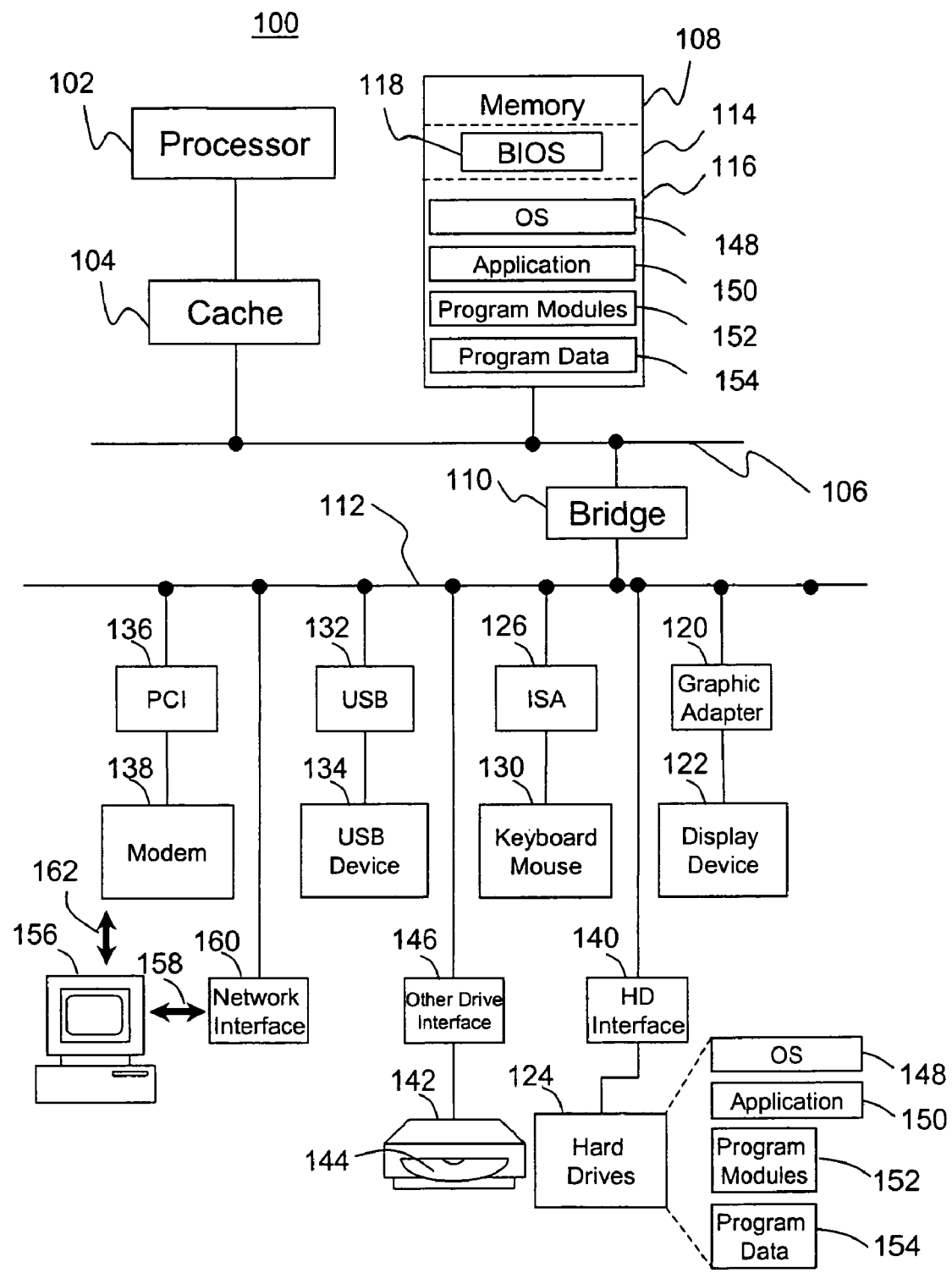
FIG. 1 shows a generic computing environment in which the present invention may be implemented.

FIG. 1 and the following discussion are intended to provide a brief general description FIG. 1 illustrates a block diagram of a suitable computing environment in which a preferred embodiment of the present invention may be implemented.

Those skilled in the art will appreciate that the invention may be practiced with many computer system configurations, including personal computers, hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Although not required, the invention will be described in the general context of computer-executable instructions, such as program modules, being executed by a personal computer. Generally, program modules include routines, programs, objects, components, data structures and the like that perform particular tasks or implement particular abstract data types.

With reference to FIG. 1 an exemplary system 100 for implementing the invention may be, for example, one of the general purpose computers. The system 100 includes processor 102, which in the exemplary embodiment are each connected to cache memory 104, the cache 104 is connected in turn to a system bus 106 that couples various system components.

Also connected to system bus 106 are a system memory 108 and a host bridge 110. Host bridge 110 connects I/O bus 112 to system bus 106, relaying and/or transforming data transactions from one bus to the other. The system bus 106 and the I/O bus 112 may be any of several types of bus structures including a memory bus or memory controller, a peripheral bus, and a local bus using any of a variety of bus architectures. The system memory includes read-only memory (ROM) 114 and random access memory (RAM) 116. A basic input/output system 118 (BIOS), containing the basic routines that help to transfer information between elements within the personal computer 100, such as during start-up, is stored in ROM 114.

In the exemplary embodiment, the system 100 may further include a graphics adapter 120 connected to I/O bus 112, receiving user interface information for display device 122. A user may enter commands and information into the system 100 through input devices 130 such as a conventional mouse, a key board 130, or the like. Other input devices 134 may include a microphone, joystick, game pad, satellite dish, scanner or the like. The devices may be connected via an Industry Standard Architecture (ISA) bridge 126, or a Universal Serial Bus (USB) bridge 132 to I/O bus 112, respectively. PCI device such as a modem 138 may be connected to the I/O bus 112 via PCI bridge 136.

The exemplary system 100 may further include a hard disk drive 124 for reading from and writing to a hard disk, connected to the I/O bus via a hard disk interface 140, and an optical disk drive 142 for reading from or writing to a removable optical disk 144 such as a CD-ROM or other optical media. The hard disk drive 124, magnetic disk drive 28, and optical disk drive 142 may be connected to the I/O bus 112 by a hard disk drive interface 140, and an optical drive interface 146, respectively. The drives and their associated computer-readable media provide non-volatile storage of computer readable instructions, data structures, program modules and other data for the system 100. Although the exemplary environment described herein employs a hard disk 124 and a removable optical disk 144, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk 124, optical disk 144, ROM 118 or RAM 116, including an operating system 148, one or more application programs 150, other program modules 152 and program data 154.

The exemplary system 100 may operate in a networked environment using logical connections to one or more remote computers, such as a remote computer 156. The remote computer 156 may be another personal computer, a server, a router, a network PC, a peer device or other common network node, and typically includes many or all of the elements described above relative to the exemplary system 100. The logical connections depicted in FIG. 1 include a network 158, for example, a local area network (LAN) or a wide area network (WAN). Such networking environments are commonplace in offices, enterprise-wide computer networks, Intranets and the Internet.

When used in a networking environment, the exemplary system 100 is connected to the local network 158 through a network interface or adapter 160. The exemplary system 100 may use the modem 138 or other means for establishing communications 162 over a wide area network such as the Internet. In a networked environment, program modules depicted relative to the exemplary system 100, or portions thereof, may be stored in the remote memory storage device. It will be appreciated that the network connections shown are exemplary and other means of establishing a communications link between the computers may be used.

The exemplary embodiment shown in FIG. 1 is provided solely for the purposes of explaining the invention and those skilled in the art will recognize that numerous variations are possible, both in form and function. For instance, the exemplary system 100 may also include a magnetic disc drive, and numerous other optional components. All such variations are believed to be within the spirit and scope of the present invention. The exemplary system 100 and the exemplary figures below are provided solely as examples for the purposes of explanation and are not intended to imply architectural limitations. In fact, this method and system can be easily adapted for use on any programmable computer system, or network of systems, on which software applications can be executed.

Figure 2:
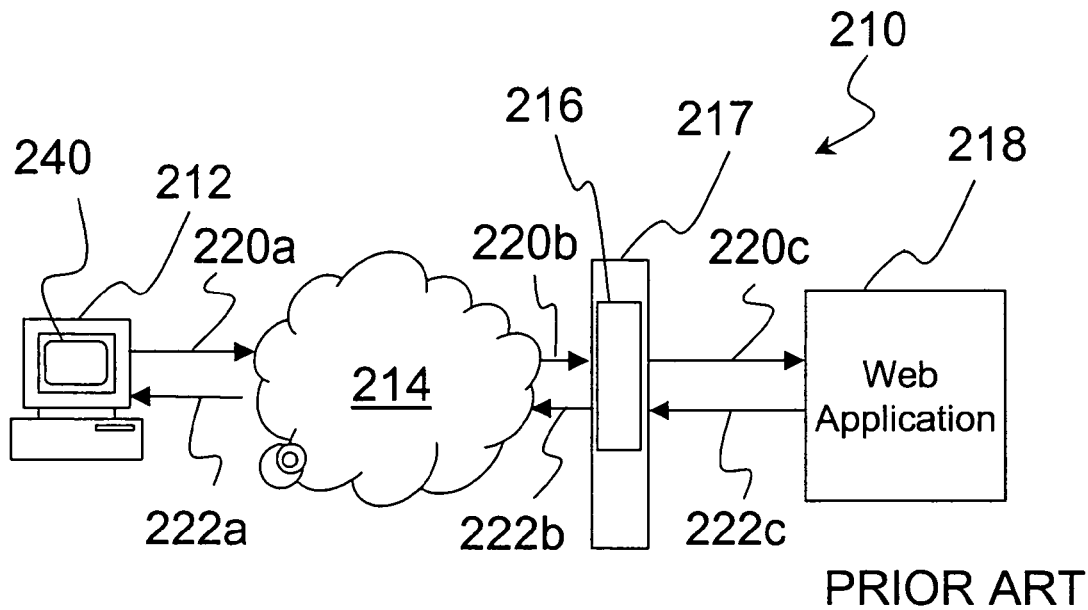
FIG. 2 shows a generic overview of a web application environment.

FIG. 2 provides an overview of a network 210 with a firewall 216 separating the web application 218 with the client browser 240 on a computer 212 over a public network 214 such as Internet. The web server 217 generally monitors the requests 220 from a web browser 240 to a web application 218. The web server 217 may include a firewall 216. The web application 218 may be a business reporting engine.

Figure 3:
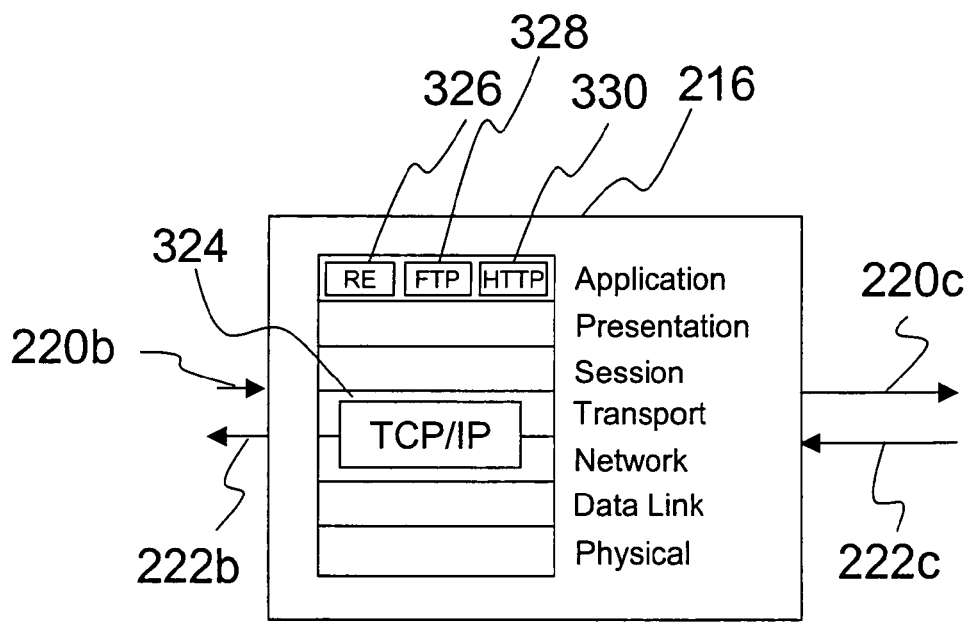
FIG. 3 shows examples of firewalls in relation to the OSI model.

Referring to FIG. 3, one type of firewalls 216 is the network layer firewall 324 operating at the TCP/IP protocol stack as IP-packet filters, allowing packets to pass through the firewall only when they match the rules. The rules could be defined by the user; or by default. Network firewalls exist in most computer operating system and network appliances. Network firewalls deal with the numerous possible combinations that are to be allowed and forbidden at the transmission control protocol (TCP) and Internet protocol (IP) level.

Another type of firewall is an application layer firewall operating at the application layer of a protocol stack. It may be a host using a proxy server or gateway, or a module embedded within an application. The purpose of an application firewall is to proxy traffic instead of routing it. As it works at the application layer, it may be configured to inspect the contents of the traffic, blocking what the firewall administrator views as inappropriate content, such as invalid request or attempts to exploit logical flaws in the application. The application firewall may be configured by a set of predetermined rules that are read at the time of startup.

In business intelligence applications, a report engine (RE) may need to communicate with remote users or services. To increase security, it may use an application firewall 326 to monitor and filter traffic to protect itself against attacks from malicious users.

Figure 4:
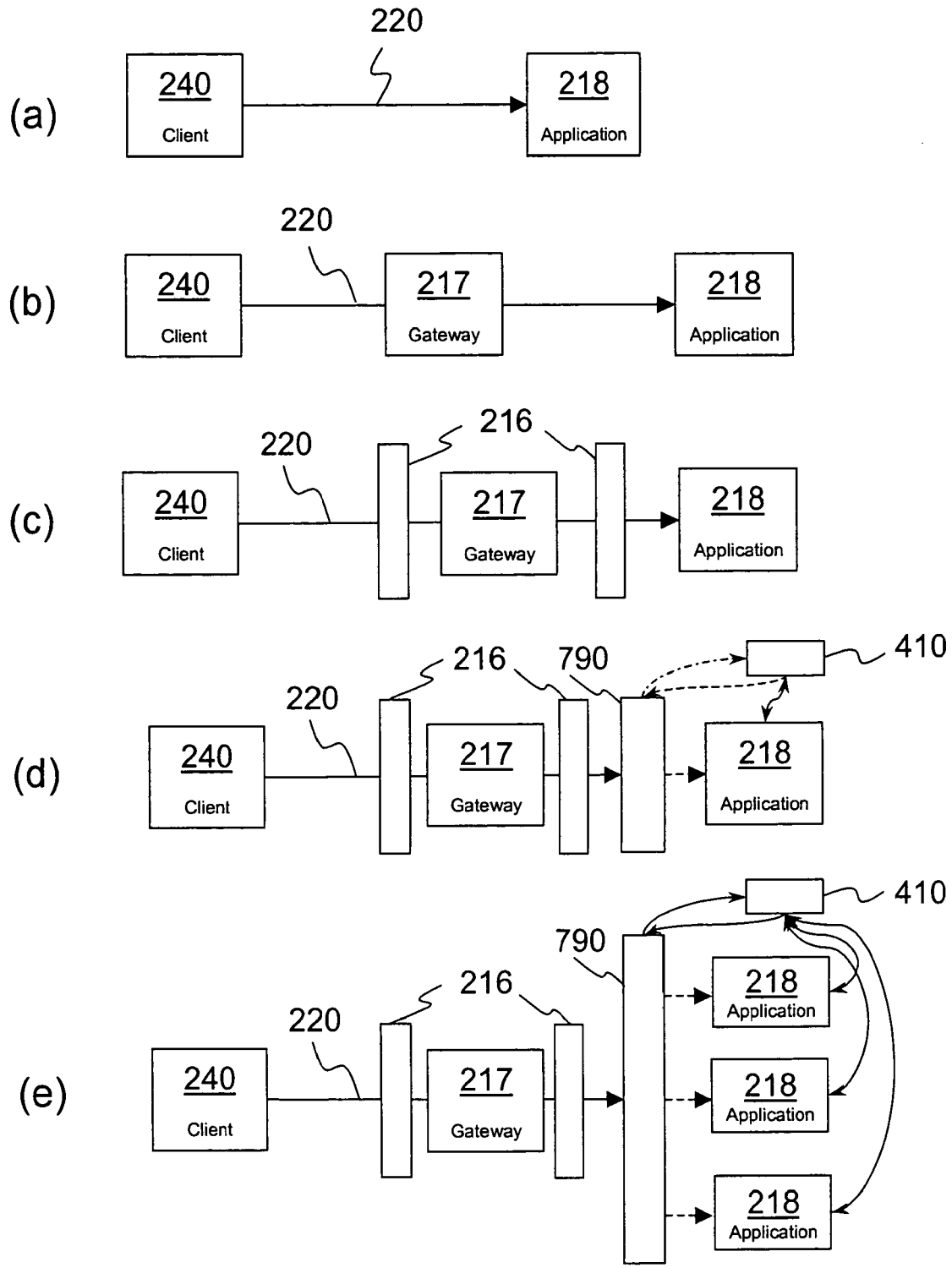
FIG. 4 shows examples of relationships between web clients and web applications.

Different examples of authentication are presented in a logical schematic in FIG. 4. In FIG. 4(a), the client 240 is sending a request 220 to the web application 218 directly.

In FIG. 4(b), a gateway 217 is used between the client 240 and the web application 218. A gateway is a custom web server module or plug-in created to process requests, and it generally the first point of contact for a web application. The term "gateway" is intended to include any gateways known to a person skilled in the art, for example, CGI; ISAPI for the Microsoft Internet Information Services (IIS) web server; Apache web server module; a servlet gateway; or the like.

In FIG. 4(c), network firewalls 216 are placed in front of the gateway 217 and web application 218 to provide additional network security.

As illustrated in FIG. 4(d) an application firewall 790 is layered on top of an application 218, and performs an analysis of the request 220. If the application 218 is required to authenticate users or needs to check user access control lists, it may use a separate authentication provider 410. The authentication provider 410 may be on a remote system. If an application 218 does not perform the authentication properly, for example, fails to properly check the permission and the capability of the client 240, the application may need to be re-deployed through time-consuming new-releases.

In FIG. 4(e), in accordance with one embodiment of the present invention, an application firewall 790 may be configured to authenticate client requests with an authentication provider 410 independently of the application 218 in cases where the application fails to make the proper checks. In accordance with another embodiment of the present invention, an application firewall 790 may be required to enhance security for multiple applications.

Figures 5A, 5B, 5C:
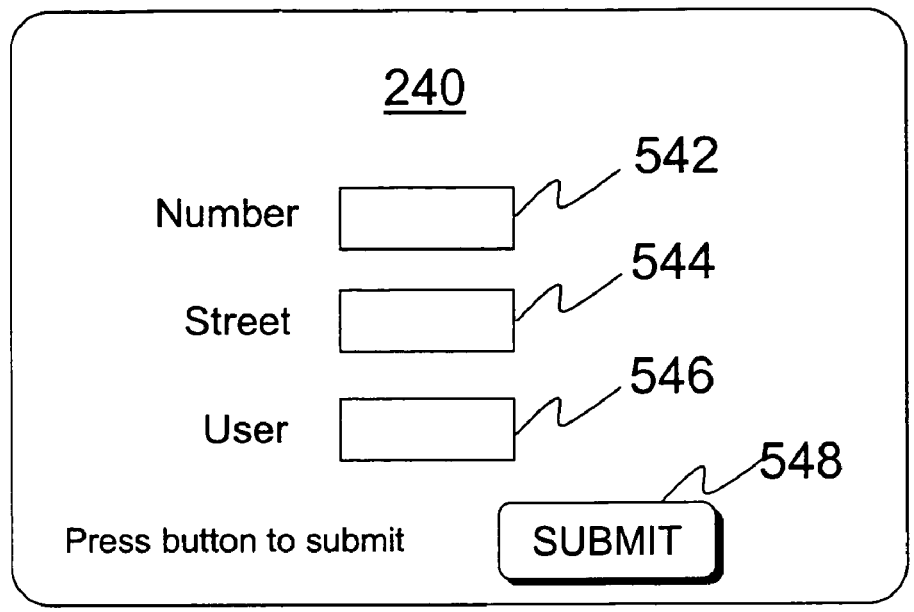
FIG. 5a shows example a web browser with a fill-out form.
FIG. 5b shows a query originated from the fill-out form.
FIG. 5c shows an example of a query URL.

Referring to FIGS. 2 and 5, an exemplary web browser 240 with a fill-out form with three text input fields 542, 544, 546 is shown in FIG. 5a. FIG. 5b is the corresponding implementation in HTML. From the web application's 218 point of view, the path (e.g. http:/www.example.com/cgi-bin/file-query) is defined to be served by a CGI program. Whenever a request 220 to the matching URL is received, the corresponding program (e.g. file-query) is called, with any data that the client sent as input 220C. Output from the program is collected by the web server, augmented with appropriate headers, and sent back 222 to the client.

Referring to FIG. 5b, the FORM tag specifies a fill-out form within an HTML document. The attributes inside the FORM tags may be one, or more than one of ACTION, METHOD. ACTION refers to URL to a query server to which the contents of the form are submitted. METHOD is the method used to submit the fill-out form to a query server, and is either GET or POST.

GET is the method wherein the fill-out form contents are sent as part to the URL. When the "SUBMIT" button is pressed, the contents of the form will be assembled into a query URL as shown in FIG. 5C. With the exception of "=" that separate names and values, and "&" that separate name/value pairs, characters such as "=" and "&" inside any of the "name" or "value" pairs will be escaped, and spaces are changed into "+" and some other characters are encoded into hexadecimal.

POST is the method that causes the fill-out form contents to be sent to the server in a separate data block. The contents of the form are encoded exactly as with GET, but rather than appending them to the URL specified by the form's ACTION attribute as a query, the contents are sent in a data block as part of the POST operation.

Other tags may be nested inside the FORM tag. For example, the INPUT tag is used to specify input elements inside a FORM. It is a standalone tag; it does not surround anything and there is no terminating tag </INPUT>. Different TYPES of INPUT tags are defined as widget elements, and used as attributes to INPUT tag, for example, "text" is used as default for text entry field; "submit" as a push button causing the current form to be packaged up into a query URL and sent to a remote server; "reset" as a push button causing the input elements in the form to be reset to the default values. Other TYPES include: "password" for entering characters displayed as asterisks; "checkbox" for a single toggle button; and "radio" a single toggle button in "one of many" behavior.

NAME is the symbolic name, for example "a", "b" and "c" in FIG. 5B, for the input fields. When the user places data in these items in the form, that information is encoded into the form data. The value each of the input items is given by the user. The NAME attribute is used for assembling query string sent to the remote server when the filled-out form is submitted. Form data is a stream of name=value pairs separated by the character "&". Each name=value pair is URL encoded, i.e. spaces are changed into "+" and some characters are encoded into hexadecimal.

Other attributes for the INPUT tag include VALUE, which is used differently for different types, for example, VALUE may be used to specify the label for the push button types. For a text or password entry field, VALUE may be used to specify the default contents of the field. For a checkbox or a radio button, VALUE may specify the value of the button when it is checked. SIZE; and MAXLENGTH may be used for the physical size and the maximum number of characters for the input fields.

Referring to FIGS. 2 and 5, if "888" is typed into the first field, "Main" into the second, and "Admin" into the third, the query that results from this form, after passing the web server 217 may be shown in FIG. 5c:

"file-query?a=888&b=Main&c=admin"

Here, each text entry field is given a distinct Name attribute, e.g. "a", "b", and "c". If nothing is typed into any of the fields, the corresponding "name=value" pairs will still be present in the query with the value absent. For example, if "888" is entered into the first field and "admin" into the third, and nothing into the second, the query may look similar to:

"file-query?a=888&b=&c=admin".

Requests to a web application may also originate from a software development kit, or SDK client, which is a set of development tools that provide an interface to a software application. Using this interface, a software engineer is able to create custom applications. Modem SDKs commonly make use of a set of XML or SOAP messages. Requests to a web application may also originate from an SDK client.

Figure 6:
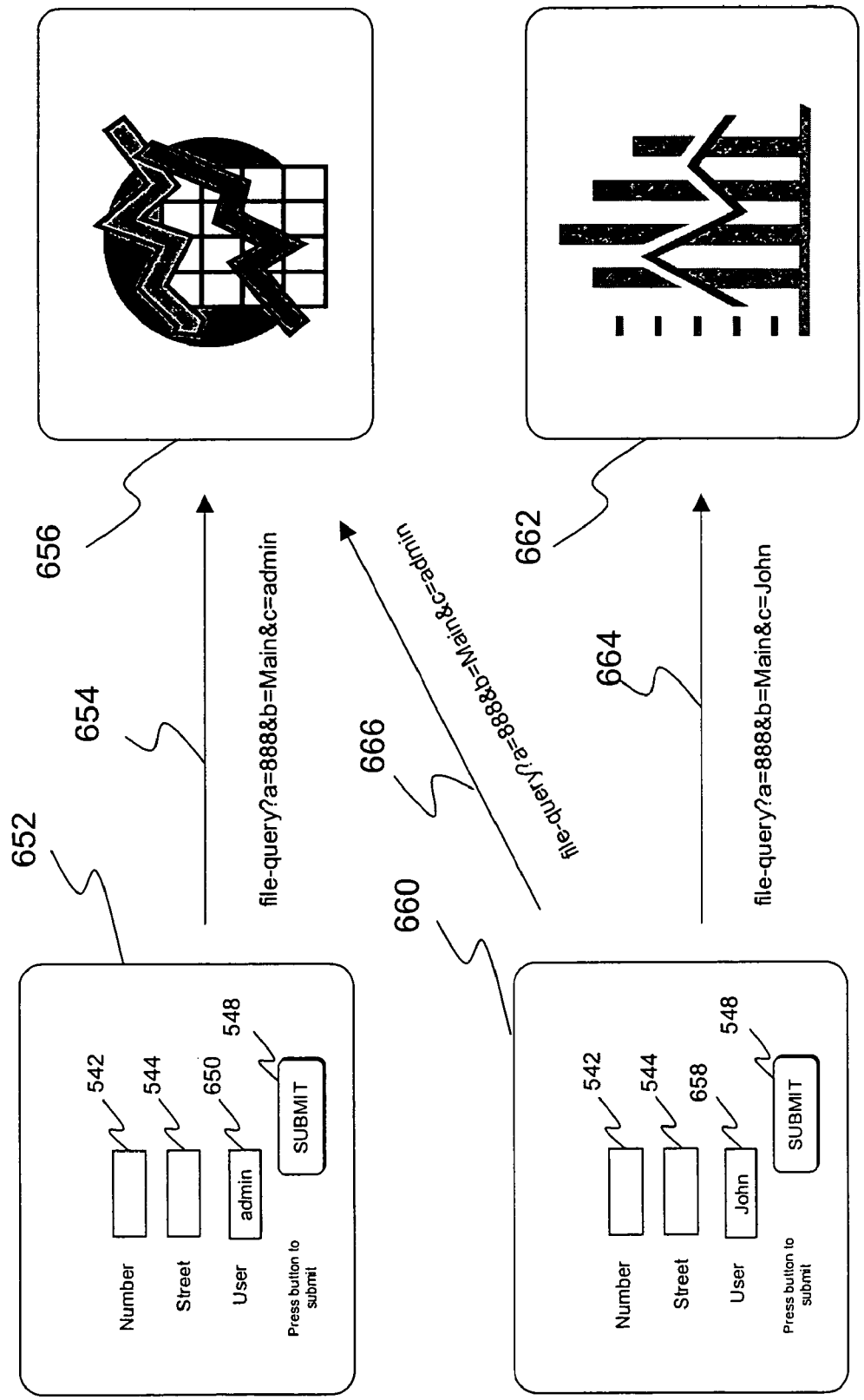
FIG. 6 illustrates client web browsers with different privileges, and an example of elevation of privilege.

Referring to FIG. 6, when user admin 650 log in at a web browser 652, a query 654 is usually sent to the web application, and resulting a display page 656 which is privileged to the user admin. When user John 658 is log in at a web browser 660, he usually receives a different display page 662 after sending a different query 664. However, if John send a query 666 similar to the user administrator's query, maliciously or inadvertently, and the web application does not have the proper access control list, an elevation of privilege takes place, and John may receive the privileged information on the web page 656. An elevation of privilege is the process to get more permission than normally assigned.

Once the elevation of privilege is successful, an application firewall may have to block the entire request, until a change can be made at the web application. For large web application, such as a business report engine, the changes can be complex and time consuming.

Figure 7:
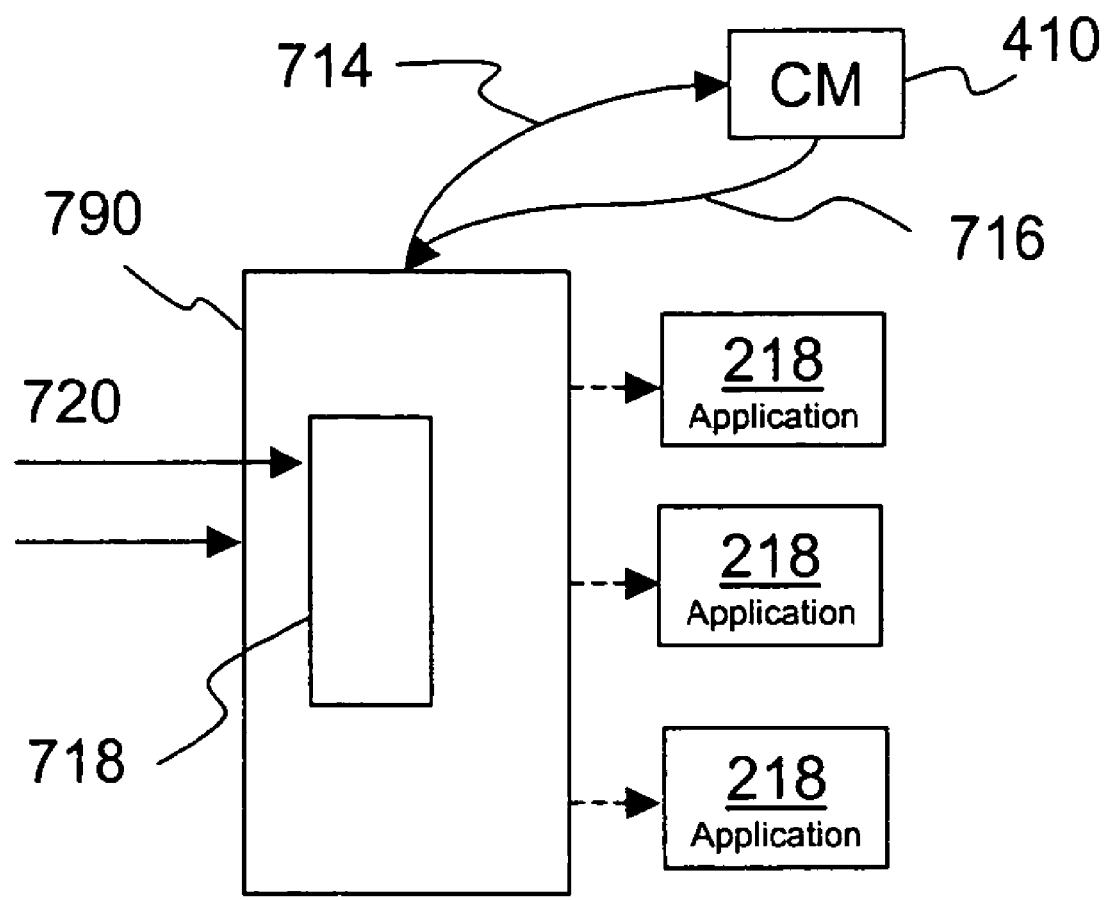
FIG. 7 depicts an embodiment of an application firewall in collaboration with an access control list checking.

Referring now to FIG. 7, in accordance to one embodiment of the present invention, an application firewall 790 dynamically identifying the permission and capability by checking the rules 718. The rules are independent of the web application and can be updated easily. The application firewall 790 reads the rules to determine whether or not to make an ACL check. The ACL table information may be stored in an authentication provider 410, one example of an authentication provider is a content manager. If the application firewall 790 determines that a check needs to be made, it makes a request 714 to the authentication provider 410. The authentication provider 410 will return 716 whether or not the user has permission to the resource, or the requested capability. The request 710 and response 712 may pass through a web server 710*a*, 712*a* or directly 710*b*, 712*b*.

As shown in FIG. 7, the "rules based" method and system for checking application access list for rejecting a request now resides in the application firewall. If the web application 218 fails to enforce the permission or capability checks, the rules 718 in the application firewall can easily be updated 720 independently of the web application, for example, by adding new checks without adding code to the web application. The elevation of privilege can therefore be prevented. Similarly, if an application 218 originally interacts with the authentication provider 410 directly, but fails to check the permission or capability properly, based on the analysis of the traffic, the application firewall 790 of the present invention can enforce a rule on the request, check with the authentication provider 410 and provider proper authentication.

The term "permission" is intended to include the authorization to use, access, write, read, modify, change, execute, or manipulate an object in the web application. An object may include a file, a directory, a program, a web page, a report or any other means residing in the web application. The term "capability" is intended to include the allowed state of the user to use a feature or access a service provided by the web application.

Figures 8A, 8B:
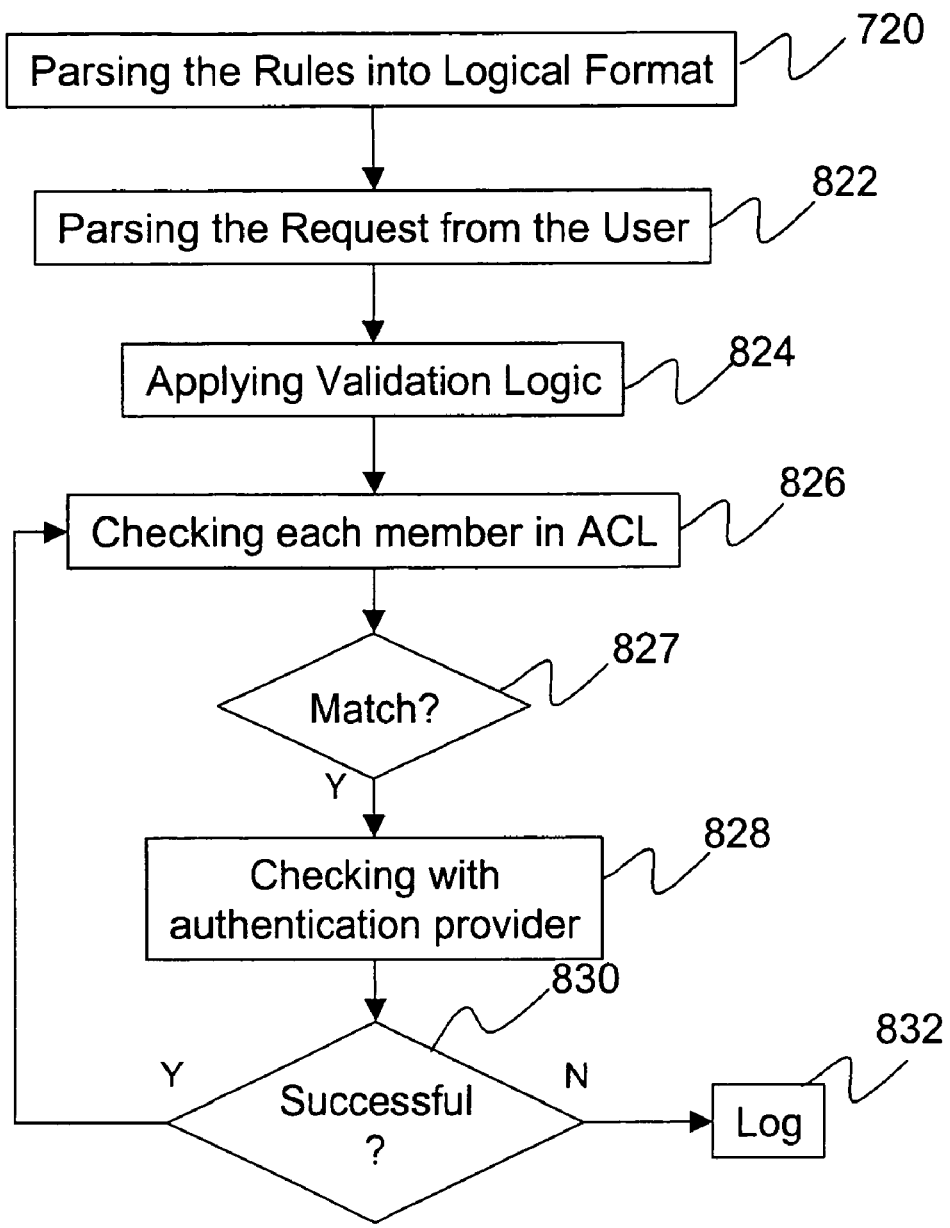

Referring to FIGS. 7 and 8, in accordance with one embodiment of the present invention, the steps of a method to check the permission or capability of a request are described. At step 720, the rules 718 in the application firewall 790 are parsed into a logical format for use in the checking process. The user request is then parsed 822 and validated 824. Each ACL check condition is checked (826) against the current request. Each condition may use a regular expression pattern to define a matching value. A regular expression is generally a string describing or matching a set of strings, according to certain syntax rules. Regular expressions are used to search and manipulate bodies of text based on certain patterns. If there is a match 827, a check is made with the authentication provider on whether the user has permission to execute the request 828. For example, whether the user has the permission to execute a file "a" within the context of the web application. If the check is successful, the next ACL check condition in the list is checked 830.

Figure 9:
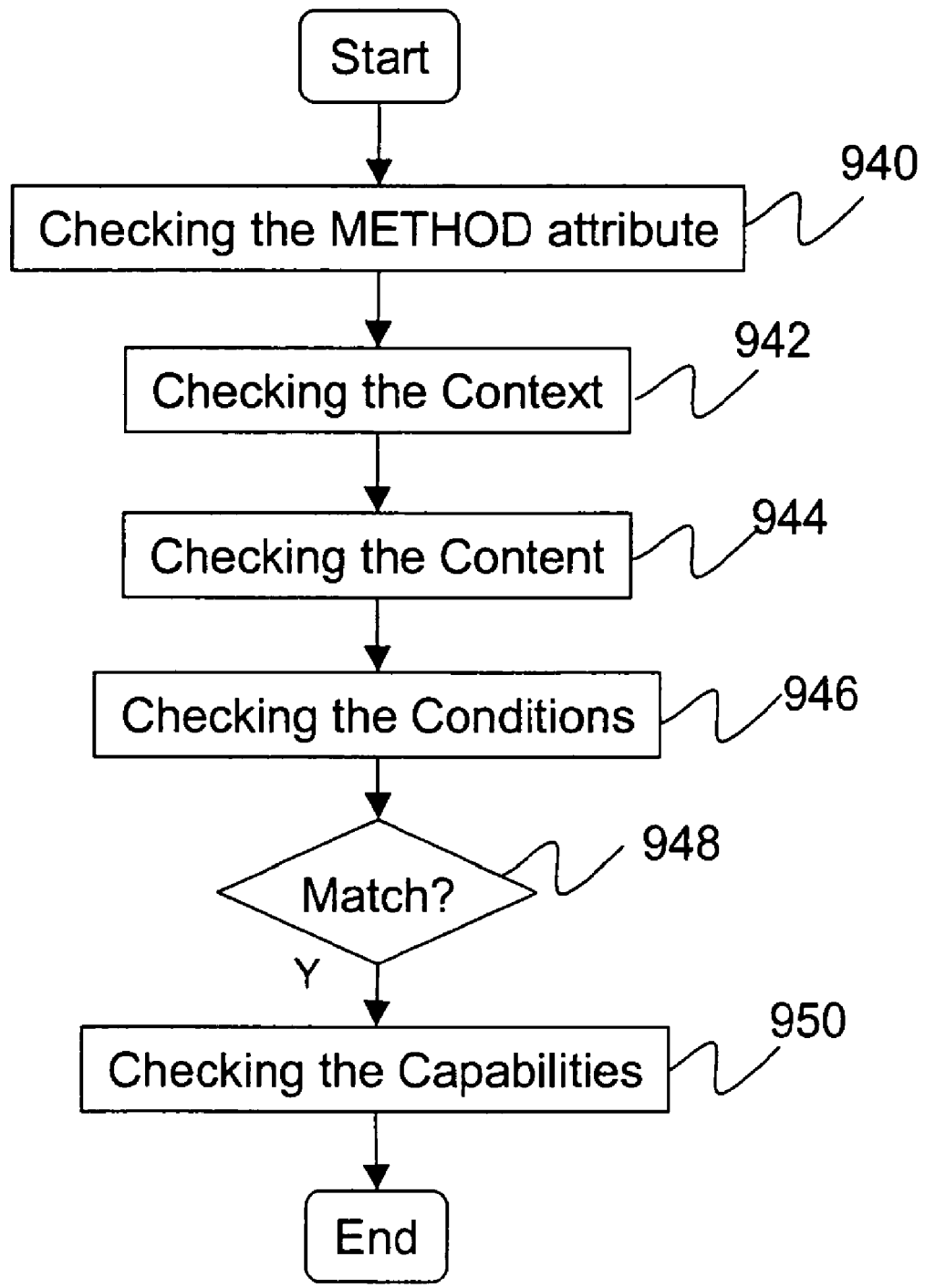
FIG. 9 is an example of capability checking.

Referring to FIGS. 7 and 9, an example of checking capability in accordance with one embodiment of the present invention is given. This figure provides an example of an access control rule that checks whether a user accessing the system has administration rights. The access control list checking is started by checking the HTTP request METHOD header. The METHOD may be either GET or POST 940. The context being checked at 942 is product specific. At 944 the content is checked. The CONTENT may be an HTTP form or an XML SDK request. Various conditions may be part of the rules 718 in the application firewall 790, for example, whether a "name" parameter is equal to "admin" or "administrator", and parameter "path" is equal to "portal/admin.html". The conditions are further specified by an operand for the various variables in the conditions. The operand may be "AND", "OR", or "NOT". The conditions are checked 946. If the parameters in a request match the rules set forth 948, it will then be determined whether the user has the capability, e.g. "canUseAdministrationPortal" 950. The checking the capability step 950 may be performed on a remote system, or using the remote system's ACL.

An example for capability check as described above is summarized below:

Example 1

```
<acl name="administrationPortal" method="any" context="any" content="form">
    <condition>
        <operand type="and">
            <variable name="name">
                <pattern value="^(admin|administrator)$"/>
            </variable>
            <variable name="path">
                <pattern value="^portal/admin.html$"/>
            </variable>
        </operand>
    </condition>
    <checks>
        <check>
            <capability value="canUseAdministrationPortal"/>
        </check>
    </checks>
</acl>
```

Figure 10:
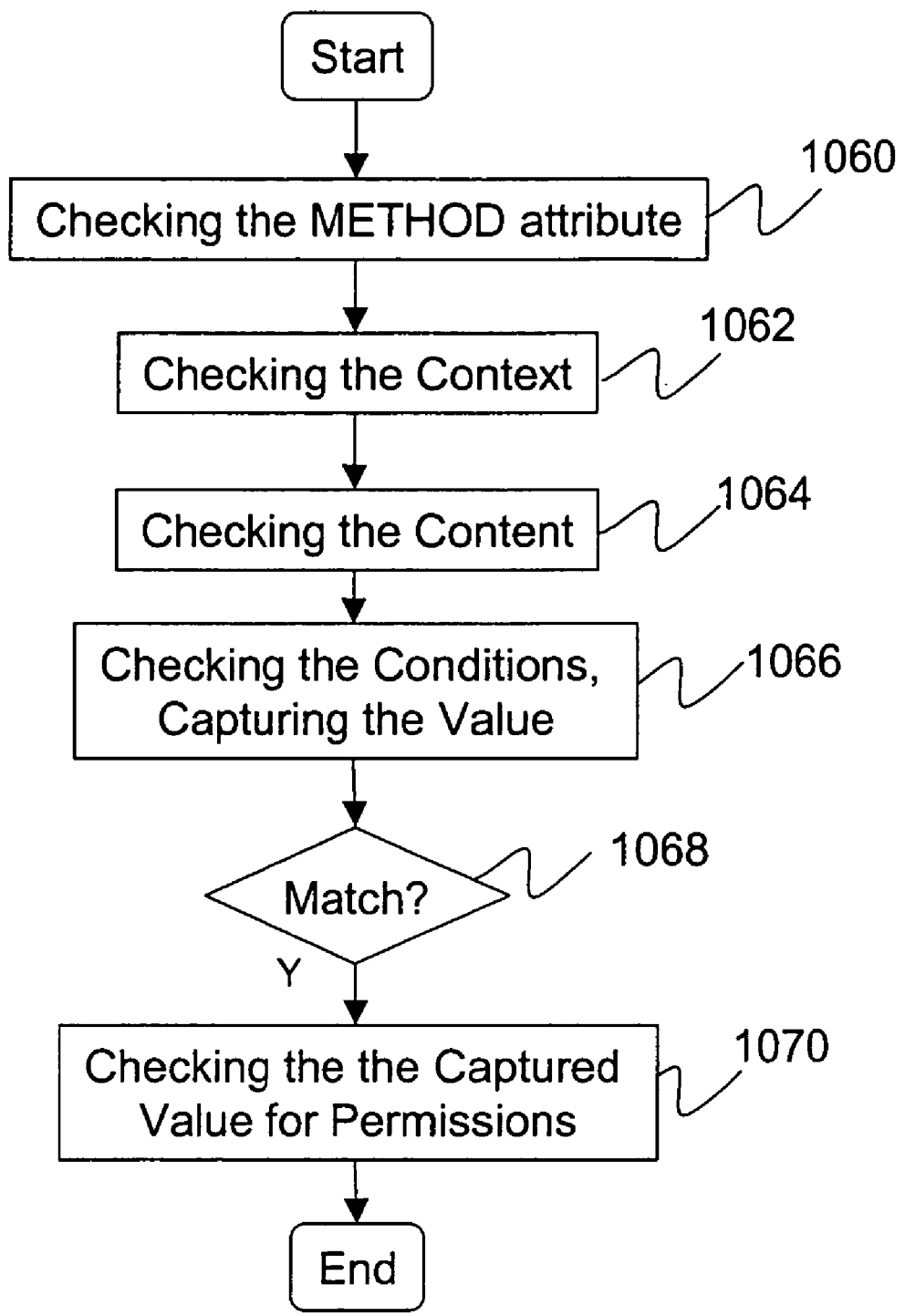
FIG. 10 is an example of permission checking.

Referring to FIG. 10, the permission to access an object is illustrated. Similar to the capability check, access control list checking is started by checking the METHOD attribute. The METHOD may be either GET or POST 1060. The context being checked at 1062 is product specific. At 1064 the content is checked. The CONTENT may be an HTTP form or an XML SDK request. Various conditions may be part of the rules 718 in the application firewall 790, for example, whether an "action" parameter is equal to "view" The value (e.g. "reportName" parameter) that will become the target of the check may be captured, and stored internally (e.g. as "report"). This value may then be used in the check with the remote system. The conditions are further specified by an operand for the various variables in the conditions. The operand may be "AND", "OR", or "NOT". The conditions are checked 1066. If the parameters in a request match the rules set forth 1068, it will then attempt to determine whether the user has the "read" permission, on the value, e.g. "reportName" that was captured 1070. The checking the capability step 1070 may be performed on a remote system, or using the remote system's ACL.

An example for permission check as described above is summarized below:

Example 2

```
<acl name="viewReport" method="any" contect="any" content="form">
    <condition>
        <operand type="and">
            <variable name="action">
                <pattern value="^view$"/>
            </variable>
            <variable name="reportName" captureAs="report">
                <pattern value="^[A-Z]{1, 1024)$"/>
            </variable>
        </operand>
    </condition>
    <checks>
        <check>
            <permission value="view" object="report"/>
        </check>
    </checks>
</acl>
```

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). Further, a computer data signal representing the software code which may be embedded in a carrier wave may be transmitted via a communication network. Such a computer readable memory and a computer data signal are also within the scope of the present invention, as well as the hardware, software and the combination thereof.

The present invention has been described with regard to one or more embodiments. However, it will be apparent to persons skilled in the art that a number of variations and modifications can be made without departing from the scope of the invention as defined in the claims.

What is claimed is:

1. A computer software product stored on a medium for checking an access control list for a web application comprising:

a memory having microcontroller-readable code embedded therein for checking an access control list for a web application, said code comprising:

code means for receiving a request from a web client;

code means for parsing the request to an application firewall, said application firewall having a rule and residing independently of the web application, said rule having syntax to identify a parameter in the request;

code means for checking the received request based on said rule;

code means for allowing the received request passing through the application firewall upon matching the rules; and code means for checking the access control list with an authentication provider.

2. The computer software product as claimed in claim 1, wherein the access control list is provided by an independent authentication provider.

3. The computer software product as claimed in claim 1, wherein the authentication provider is a remote software module.

4. The computer software product as claimed in claim 1, wherein the authentication provider is a remote system.

5. The computer software product as claimed in claim 1, wherein the application firewall is operatively responsible for a plurality of web applications.

6. The computer software product as claimed in claim 1, wherein the syntax is selected from a group consisting of name, operand type; context, method, content, and combination thereof.

7. The computer software product as claimed in claim 1, wherein the access control list is checked for a user's permission to access an object within a system.

8. The computer software product as claimed in claim 1, wherein the access control list is checked for a user's capability to access a service provided by a system.

9. A system for checking an access control list for a web application, comprising:
   means for receiving a request from a web client;
   means for parsing the request to an application firewall, said application firewall having a rule and residing independently of the web application, said rule having syntax to identify a parameter in the request;
   means for checking the received request based on said rule;
   means for allowing the received request passing through the application firewall upon matching the rules; and
   means for checking the access control list with an authentication provider.

10. The system as claimed in claim 9, wherein the access control list is provided by an independent authentication provider.

11. The system as claimed in claim 9, wherein the authentication provider is a remote software module.

12. The system as claimed in claim 9, wherein the authentication provider is a remote system.

13. The system as claimed in claim 9, wherein the application firewall is operatively responsible for a plurality of web applications.

14. The system as claimed in claim 9, wherein the syntax is selected from a group consisting of name, operand type; context, method, content, and combination thereof.

15. The system as claimed in claim 9, wherein the access control list is checked for a user's permission to access an object within a system.

16. The system as claimed in claim 9, wherein the access control list is checked for a user's capability to access a service provided by a system.

* * * * *